United States Patent
Krabill et al.

(10) Patent No.: US 6,870,363 B2
(45) Date of Patent: Mar. 22, 2005

(54) SPEED SENSOR TARGET WHEEL WITH IMPROVED RETENTION CAPABILITY

(75) Inventors: Timothy J. Krabill, Louisville, OH (US); Edward S. Czekansky, North Canton, OH (US)

(73) Assignee: The Timken Company, Canton, OH (US)

( * ) Notice: Subject to any disclaimer, the term of this patent is extended or adjusted under 35 U.S.C. 154(b) by 57 days.

(21) Appl. No.: 10/145,419

(22) Filed: May 14, 2002

(65) Prior Publication Data

US 2003/0215168 A1 Nov. 20, 2003

(51) Int. Cl.$^7$ ............................ G01B 7/30; F16C 32/00
(52) U.S. Cl. ............ 324/166; 324/207.25; 324/207.22; 384/448
(58) Field of Search .................... 384/448; 324/166, 324/173, 174, 207.2–207.25

(56) References Cited

U.S. PATENT DOCUMENTS

| | | | |
|---|---|---|---|
| 3,500,091 A | 3/1970 | Jones | |
| 4,171,495 A | 10/1979 | McNinch, Jr. | |
| 4,555,685 A | 11/1985 | Maruyama | |
| 4,667,156 A | 5/1987 | Machino et al. | |
| 4,795,278 A | 1/1989 | Hayashi | |
| 4,797,611 A | 1/1989 | Schreiber | |
| 4,940,936 A | * 7/1990 | Grillo et al. | 324/174 |
| 4,940,937 A | 7/1990 | Hattori et al. | |
| 4,969,694 A | 11/1990 | Caron | |
| 4,974,309 A | 12/1990 | Hattori et al. | |
| 5,002,287 A | 3/1991 | Eskilsson | |
| 5,085,519 A | 2/1992 | Dougherty | |
| 5,090,236 A | 2/1992 | Vignotto | |
| 5,127,747 A | * 7/1992 | Hilby et al. | 384/448 |
| 5,184,069 A | 2/1993 | Adler et al. | |
| 5,431,413 A | 7/1995 | Hajzler | |
| 5,458,420 A | 10/1995 | Otto | |
| 5,551,291 A | 9/1996 | Morita | |
| 5,570,013 A | 10/1996 | Polinsky et al. | |
| 5,611,545 A | * 3/1997 | Nicot | 277/402 |
| 5,722,664 A | 3/1998 | Otto | |
| 5,736,853 A | 4/1998 | Rigaux | |
| 5,816,711 A | 10/1998 | Gingrich | |
| 6,003,871 A | 12/1999 | Poll | |
| 6,089,757 A | 7/2000 | Ouchi | |
| 6,498,475 B2 | * 12/2002 | Foster et al. | 324/173 |
| 6,573,705 B1 | 6/2003 | Tajima et al. | |

FOREIGN PATENT DOCUMENTS

| | | |
|---|---|---|
| DE | 4212973 | 10/1993 |
| EP | 0942287 | 9/1999 |
| JP | 2001082979 | 3/2001 |

* cited by examiner

*Primary Examiner*—Jay Patidar
(74) *Attorney, Agent, or Firm*—Polster, Lieder, Woodruff & Lucchesi L.C.

(57) ABSTRACT

An improved target wheel is provided for a bearing speed sensor. The target wheel includes an annular base which is sized to be press fit on a seat or extension of the inner race of a bearing. The base includes a first end and a second end. A plurality of encoding elements, in the form of spaced apart teeth, operatively extend from the first end of the base. The base is bent upwardly near the second end to form a portion which extends out of the plane of the base. This portion defines an angle of less than 90° with the plane of the base, and preferably forms an angle of about 30° to about 40°.

10 Claims, 3 Drawing Sheets

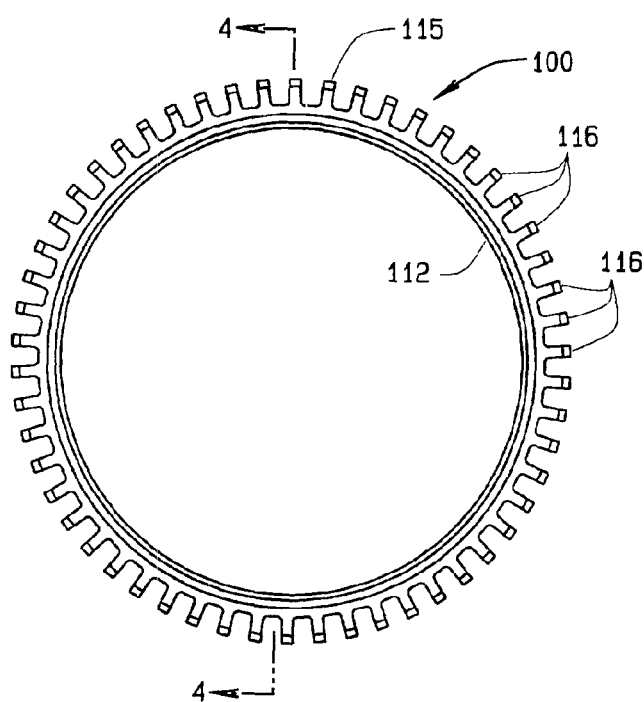
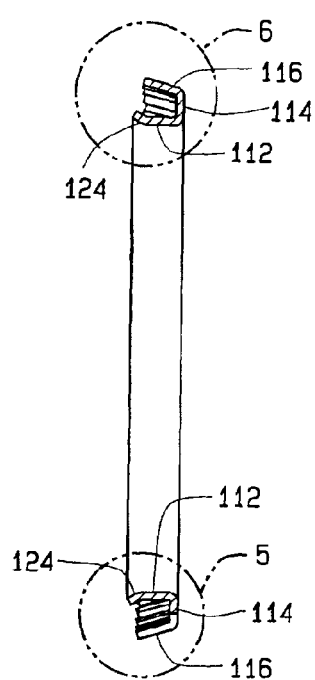
FIG. 3       FIG. 4
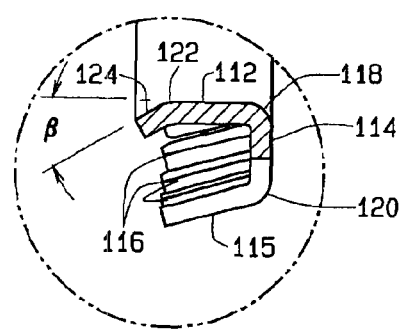
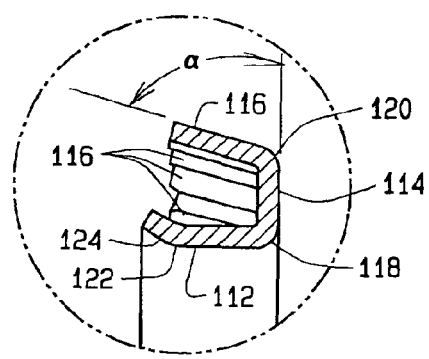
FIG. 5       FIG. 6

SPEED SENSOR TARGET WHEEL WITH IMPROVED RETENTION CAPABILITY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to target wheels for speed sensors used to determine the rotational speed of a bearing, axle, or the like, and, in particular, to a target wheel with improved retention capabilities.

The rotational speed of a bearing or axle is important in many applications. For example, anti-lock brake systems (ABS) rely on sensors which monitor the rotational rate of the bearing (and hence of the vehicle wheel) in controlling ABS. The sensing system typically includes a target wheel which rotates with the rotating portion of the bearing and a sensor. Prior art target wheels are shown, for example, in U.S. Pat. Nos. 5,085,519 and 5,816,711, which are incorporated herein by reference. When applied to the bearing inner race, the target wheel is press fit onto the bearing inner race with a press fit of approximately 0.02 mm to approximately 0.15 mm. Until recently, these target wheels have been solid steel or powdered metal designs where the fit of the target wheel is constant across its width. More recently, stamped target wheels are being considered for applications internal to the bearing.

Stamped target wheels generally have a C-shape, as seen in FIG. 1. Such target wheels include a base 1 which is bent, as at 3. Encoding means, in the form of a plurality of spaced apart ribs or teeth 5, extend from the bend 3. With this design, the fit is not constant across the width of the target wheel. There is generally a single annular or circumferential line of contact between the target wheel and the bearing inner race 7 under the bend 3. The fit of the stamped target wheel T on the bearing inner race decreases along the length of the base 1 of the target wheel T. Due to the fit of the target wheel T on the bearing inner race 7, under a dynamic load condition, the target wheel T can walk across the cone or inner race 7. This results in (1) a change in the gap between the sensor and the target wheel; and (2) a possible loss of the sensor signal. Both of these results are undesirable.

BRIEF SUMMARY OF THE INVENTION

Briefly stated, the improved target wheel of the present invention is designed to increase the retention of the target wheel on a seat of a bearing inner race or on a shaft to reduce the walking of the target wheel. The target wheel includes an annular base which is sized to be press fit on the bearing inner race seat or upon the shaft proximate the bearing. The base includes a first end and a second end. A connecting portion extends from the first end, and encoding means are mounted to, or extend from, the connecting portion. The encoding means can be teeth which extend generally from the connecting portion. The teeth can extend over the base, or the teeth can extend away from the base. The encoding means can also be any other mechanism, such as magnetic elements, perforations, undulations, fiber optics, etc., which will create a pulsed signal when sensed by a sensor.

The base is bent upwardly near the first end and near the second end. The bend at the second end forms a portion which extends out of the plane of the base. This bent portion of the base defines an angle of less than 90° with the plane of the base, and preferably forms an angle of about 30° to about 40°. The bend at the second end of the base increases the amount of contact of the target wheel base with the bearing inner race seat relative to prior art stamped target wheels to reduce the amount of "walking" of the target wheels relative to the sensor.

BRIEF DESCRIPTION OF THE SEVERAL VIEWS OF THE DRAWINGS

FIG. 3 is a plan view of an illustrative embodiment of a target wheel of the present invention;

FIG. 4 is a cross-sectional view of the target wheel taken along line 4—4 of FIG. 3;

FIG. 5 is an enlarged cross-sectional view of the target wheel taken at circle 5 of FIG. 4;

FIG. 6 is an enlarged cross-sectional view of the target wheel taken at circle 6 of FIG. 4;

Corresponding reference numerals will be used throughout the several figures of the drawings.

DETAILED DESCRIPTION OF THE INVENTION

Figure 1:
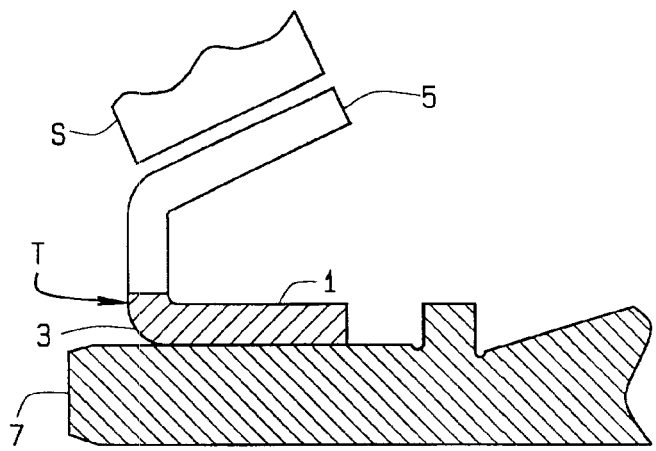
FIG. 1 is a cross-sectional view of a prior art target wheel mounted on a bearing cone.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

An illustrative embodiment of the target wheel 100 of the present invention is shown in detail in FIGS. 3–7. The target wheel 100 includes an annular or cylindrical base portion 112, a connecting or first end portion 114, and an encoder portion 115 having a plurality of spaced apart teeth 116. Although the encoding portion includes teeth as encoding elements, the form of the encoding elements do not form part of the invention, and the encoding elements can be any element which will create a pulsed signal when detected by a sensor. For example, the encoding elements can be magnets, or magnetic elements, perforations, undulations, fiber optic elements, or any other means that will produce a pulsed or interrupted signal. The target wheel 100 is preferably formed in a stamping operation, and hence includes a radially outwardly turned bend 118 at the Junction between the base 112 and the connecting or first end portion 114 and another bend 120 at the junction between the connecting portion 114 and the teeth 116. The connecting portion 114 preferably forms a right angle with the base 112. The teeth 116 form an angle a, preferably of about 75°, with the connecting portion 114. The angle α can vary depending on the location of the sensor relative to the teeth 116, and is formed to optimize detection by the sensor. Thus, the teeth can be parallel to the base 112, or form an angle between 0° and 90° with the connecting portion 114.

Figure 2:
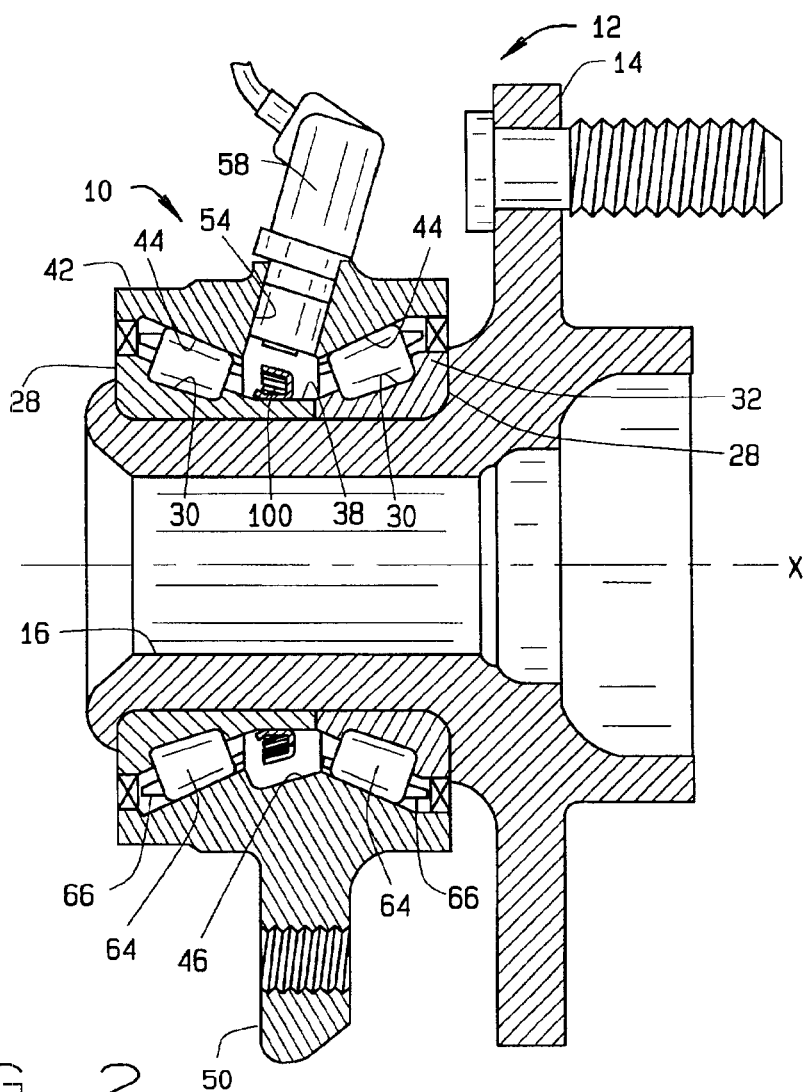
FIG. 2 is a cross-sectional view of a package bearing having a target wheel mounted therein.

The target wheel base 112 is also bent radially outwardly as at 122 to form a second end portion 124 which slopes outwardly from the plane of the base 112. The sloped second end portion 124 forms an angle β with the plane of the base 112 which is less than about 90°, and, can be in the range of about 30° to about 40°. Illustratively, the angle β is shown to be about 30° in FIGS. 5–6. As seen in FIG. 2, the second end portion 124 is spaced from the bearing extension or surface 38 along the length of the second end portion 124. We have found that by adding the bend 122 in the wheel base 112 to form the bent second end portion 124, the wheel base is in contact with the bearing inner race seat or the shaft on which the target wheel is mounted along at least two annular or circumferential lines (namely, beneath the bends 118 and 122). This increased contact with the bearing inner race or shaft on which the target wheel is mounted increases the frictional engagement between the target wheel and the bearing seat or shaft, and hence, reduces the possibility of the target wheel "walking" or moving relative to the sensor under dynamic load conditions.

Figure 7:
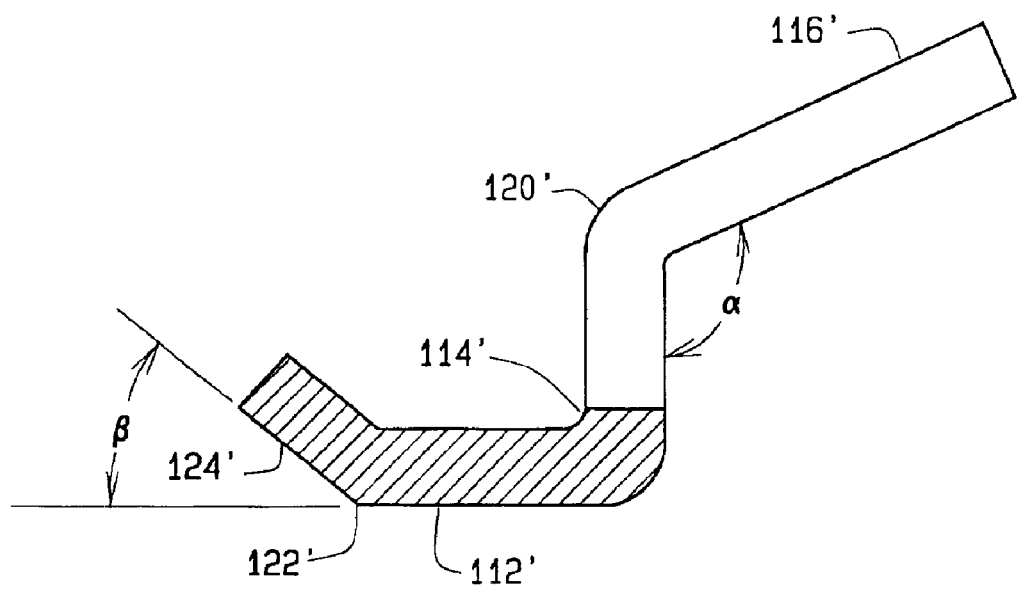
FIG. 7 is a cross-sectional view of an alternative embodiment of the target wheel.

A first variation of the target wheel 100 is shown in FIG. 7. The target wheel 100' includes a base 112' substantially similar to the base 112 of target wheel 100. The base 112' bends upwardly at 122' to form an upwardly turned section 124'. The section 124' is shown to be bent an at angle β of about 40°. At the end of the base 112' opposite the section 124', the wheel 100' includes a connecting portion 114' from which teeth 116' extend. The target wheel 100' also includes encoding elements in the form of teeth 116'. Unlike the teeth 116 (FIGS. 4–5) of the wheel 100, the teeth 116' extend away from the base 112'. The teeth 116' form an angle α of about 110°–115° with the connecting portion 114'.

Figure 8:
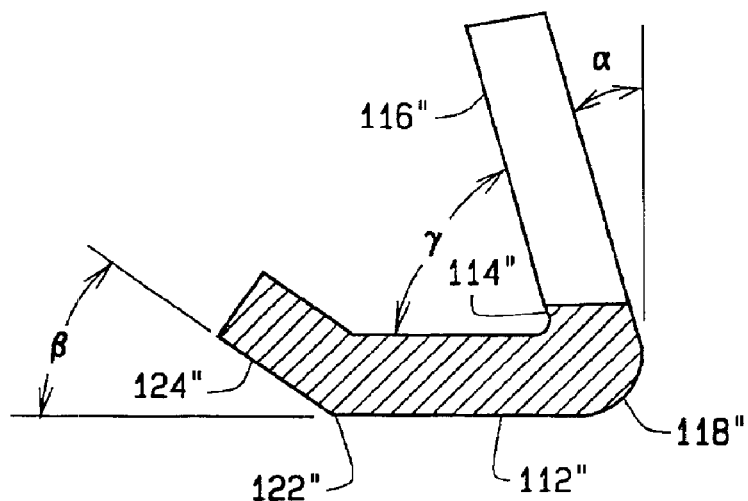
FIG. 8 is a cross-sectional view of another alternative embodiment of the target wheel.

A second variation of the target wheel 100 is shown in FIG. 8. The target wheel 100" includes a base 112" substantially similar to the base 112 of target wheel 100. The base 112" bends upwardly at 122" to form an upwardly turned section 124". The section 124" is shown to be bent an at angle β of about 35°. At the end of the base 112" opposite the section 124", the wheel 100" includes encoding means in the form of a plurality of spaced apart teeth 116". Unlike the target wheels 100 and 100', the wheel 100" includes a substantially shorter connecting portion 114". The teeth 116" form an angle α to the vertical (or radius or the wheel) of about 15°, and an angle γ of about 75° with the base 112".

In FIG. 2, the target wheel 100 is illustratively shown mounted in a package bearing assembly 10, which in turn, is mounted on a hub 12. Although shown mounted in a package bearing assembly, it will be appreciated that the target wheel 100 could be mounted within other types of bearing assemblies, or that the target wheel could be mounted on a shaft (such as a hub shaft) external to the bearing assembly.

The hub 12 is shown and described in detail in PCT application WO 9858762, which is incorporated herein by reference. Briefly, the hub 12 has a flange 14 and a stub axle or spindle 16 projecting from it into the bearing 10. The package bearing 10 can be used, for example, to mount a road wheel on the suspension system of vehicle, enabling the wheel to rotate relative to the suspension system about an axis X with minimal friction. The bearing 10 and hub 12 together constitute a hub assembly and are furnished as such to manufacturers of automotive vehicles.

The bearing 10 includes a segmented inner race in the form of two inner races or cones 28 which fit around the hub spindle 16. Each cone 28 has a tapered raceway 30 that is presented outwardly away from the axis X and a thrust rib 32 at the large end of its raceway 30. The inboard cone 28 is somewhat longer than the outboard cone 28 by reason of a cylindrical cone extension 38 which projects beyond the small end of its raceway 30. The inboard cone 28 at its cone extension 38 abuts the small end of the outboard cone 28 along the spindle 16.

A unitary outer race in the form of a double cup 42 surrounds the inboard and outboard cones 28. The outer race or cup 42 has tapered raceways 44 that are presented inwardly toward the axis X and toward the raceways 30 on the two cones 28. The cup 42 may be considered a housing in that it essentially encloses the remaining working components of the bearing 10.

Rolling elements 64, in the form of tapered rollers, are arranged in two rows between the opposing raceways 30 and 44 of the cones 28 and cup 42, respectively, there being a separate row around each cone 28. The tapered side faces of the rolling elements 64 bear against the raceways 30 and 44, there being essentially line contact between these side faces and the raceways 30 and 44. The rolling elements 64 fit within cages 66 which maintain the proper spacing between adjacent rolling elements 64 in each row. The cages 66 further hold the rolling elements 64 around the cones 28 when the cones 28 are removed from the cup 42.

Generally midway between its ends, the cup 42 has a flange 50 which fits against a component of a suspension system for a vehicle. A bore 54 is feinted in the cup flange 50 which extends inwardly, obliquely to the axis X, and opens into the interior of the cup 42 through the intervening surface 46. The oblique bore 54 contains a speed sensor 58, the inner end of which is presented toward the exciter ring or target wheel 100 that fits over the extension 38 at the small end of inboard cone 28. As can be appreciated, the extension 38 forms a seat for the target wheel 100. The encoding means (i.e., the teeth) of the target wheel 100 cause the sensor 58 to produce a pulsating signal as those encoder means move past the end of the sensor 58, and this of course occurs as the spindle 16 and the cones 28 around it rotate. The frequency of the signal reflects the angular velocity of the spindle 16 and indeed the entire hub 12. The speed sensing arrangement is similar to that disclosed in U.S. Pat. No. 5,085,519, which is incorporated herein by reference. From the above description regarding the target wheel, it will be appreciated that the bends 118 and 122 near the first and second ends of the target wheel base form two spaced-apart lines of contact on the baring seat 38. These two lines of contact increase the frictional engagement of the target wheel 100 on the bearing seat 38 to substantially reduce "walking" of the target wheel 100 during operation of the bearing.

Although the target wheel 100 is shown in a double tapered bearing, it will be appreciated that the target wheel 100 can be used in conjunction with other types of bearings, whether they be single row or double row bearings, whether they use rollers, balls, or other types of rolling elements. Alternatively, the target wheel 100 can be mounted on the shaft external to the bearing, as occurs in some instances.

As various changes could be made in the above constructions without departing from the scope of the invention, it is intended that all matter contained in the above description or shown in the accompanying drawings shall be interpreted as illustrative and not in a limiting sense. For example, the connecting portion 114" of FIG. 8 is substantially shorter than the connecting portion 114 of FIG. 5. The connecting portion could be substantially eliminated, and the encoding elements could be mounted directly to one of the inner or outer surfaces of the target wheel base. This example is merely illustrative.

What is claimed is:

1. In combination, a rotating surface and a target wheel mounted on said surface;

said surface being of constant dimension beneath said target wheel to fully support said target wheel along the length thereof;

the target wheel comprising a cylindrical base portion, a first end portion extending radially outwardly relative to said base portion, a second end portion extending radially outwardly relative to said base portion, and at least one encoder connected to said base; said base portion being sized and shaped to frictionally fit over said surface, said base portion and said first and second end portions defining radially outwardly turned bends at first and second ends of said base portion; said second end portion defining a radially outwardly turned portion which is spaced from said surface along the length of said radially outwardly turned portion; and whereby said bends at said first and second ends of said base define circumferential lines of frictional contact between said target wheel base and said surface to increase the frictional engagement of said target wheel base about said surface to prevent axial and angular movement of said target wheel relative to said surface.

2. The combination of claim 1 wherein said radially outwardly turned portion is bent at an angle of less than 90°.

3. The combination of claim 1 wherein said radially outwardly turned portion is bent at an angle of at least 30°.

4. The combination of claim 1 wherein said radially outwardly turned portion is bent at an angle of between about 30° and about 40°.

5. The combination of claim 1 wherein said target wheel includes a connecting portion at said base first end, said encoders being connected to said connecting portion.

6. The combination of claim 5 wherein said encoders comprise a plurality of spaced apart teeth which extend over said base.

7. The combination of claim 5 wherein said encoders comprise a plurality of spaced apart teeth which extend away from said base.

8. The combination of claim 1 comprising a bearing assembly rotatable about an axis, the bearing assembly including, an inner race having an inner raceway and an outer race having an outer raceway; a plurality of rolling elements positioned between said inner and outer raceways; and a cylindrical extension extending axially from said inner race, said extension having a generally cylindrical outer surface and being generally parallel to said axis; said bearing cylindrical extension defining said rotating surface.

9. The combination of claim 8 wherein said target wheel is axially spaced from said raceway.

10. The combination of claim 1 wherein said target wheel is formed in a stamping operation to form said bends at said first and second ends of said base portion.

* * * * *